June 2, 1970     J. T. ROOS     3,515,375
AERATION APPARATUS
Filed May 22, 1968
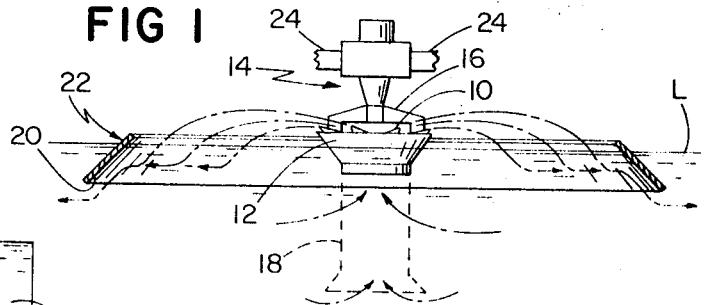
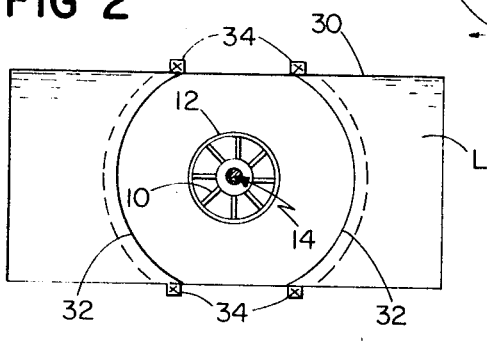
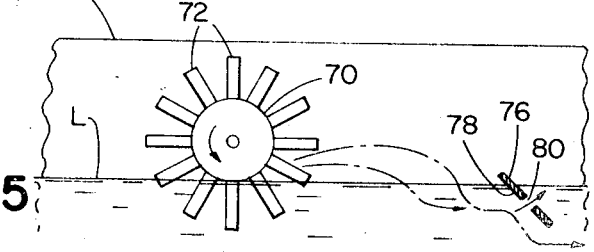
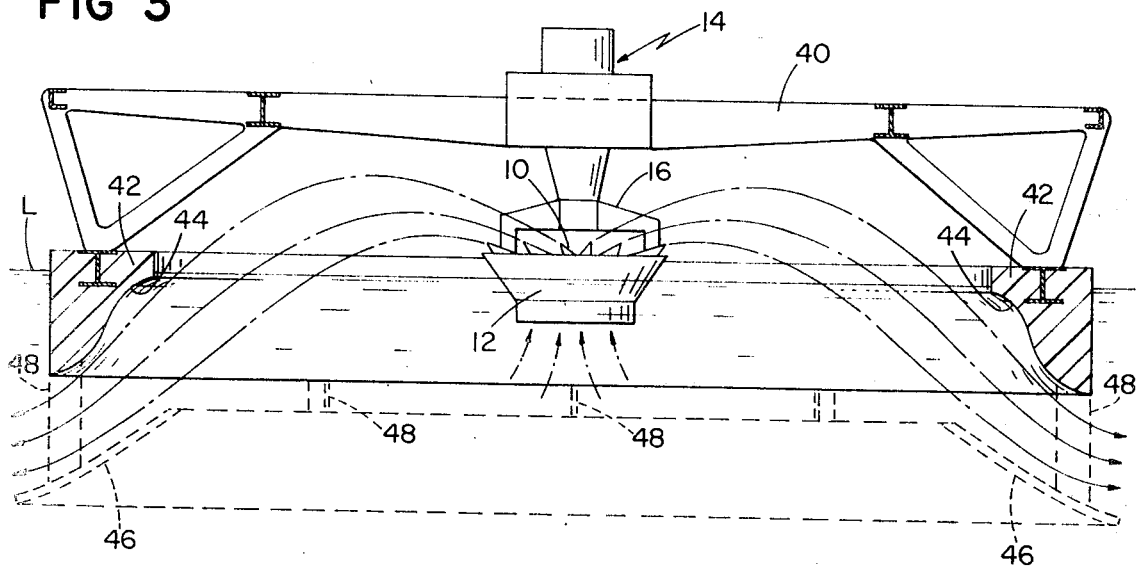
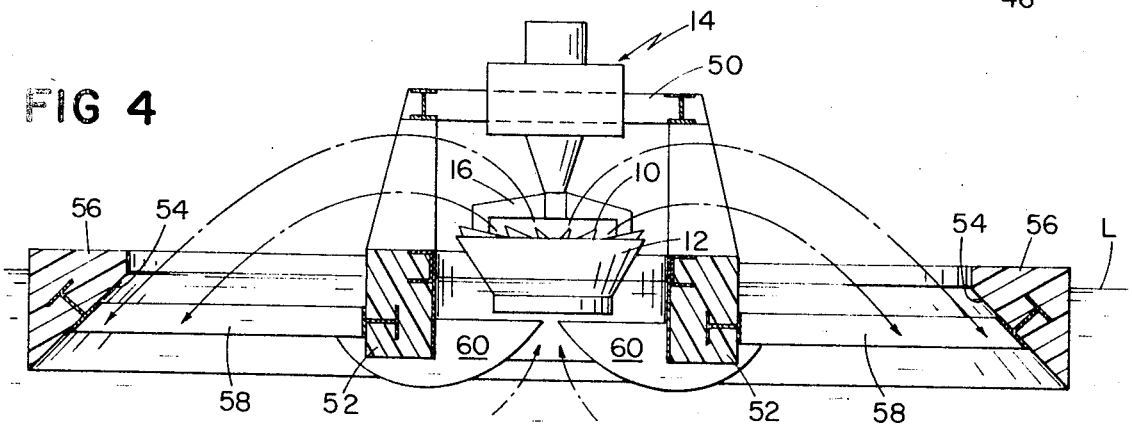

United States Patent Office 3,515,375
Patented June 2, 1970

3,515,375
AERATION APPARATUS
John Treymann Roos, Westwood, Mass., assignor to Bird Machine Company, South Walpole, Mass., a corporation of Massachusetts
Filed May 22, 1968, Ser. No. 731,071
Int. Cl. B01f 3/04, 5/10
U.S. Cl. 259—95   13 Claims

ABSTRACT OF THE DISCLOSURE

The effectiveness of mechanical surface aerators is increased by providing baffle means presenting to at least a major part of the outward flow of the air bubble-liquid mixture produced by the aerator a flow redirecting surface extending downwardly into the body of liquid and generally inclined outwardly in spaced relation to the bottom of such body. Such surface is located at a distance from the aerator, preferably beyond the limit of its throw, where the flow velocity of the mixture is sufficient to cause it to flow downwardly along and outwardly beyond the surface, such flow velocity being preferably at least about 1 foot per second so that the majority of the air bubbles are retained.

---

This invention relates to mechanical surface aerators for aerating large bodies of liquid and more particularly to means for increasing the efficiency of the oxygenation of the liquid by such aerators.

Such aerators operate by continually entrapping air in the form of bubbles in large quantities of the liquid at the air-liquid interface. The air bubble-liquid mixture may be produced by violently agitating the liquid to form it into spray streams and waves propelled outwardly, or merely by ejecting pumped liquid as spray and stream onto the surface of the liquid body, according to type of aerator. In all cases, a turbulent flow of liquid at high velocity away from the aerator is induced along the surface of the liquid which has a mixing and shearing action conducive to absorption of air from the bubbles by the liquid. As the velocity of flow slows and turbulence subsides to a more quiescent condition, the bubbles tend to escape from the surface.

The primary object of this invention is to provide, in combination with such aerators, flow directing baffle means for the bubble-liquid mix operative to increase both the retention time and rate of air transfer from a major portion of the bubbles, thereby substantially increasing the effectiveness of the aerator. Other objects are to provide such means and supports therefor of efficient design and which permit positioned self-adjustment or mechanical adjustment to conform to changing conditions.

In accordance with this invention baffle means are utilized to intercept at least a major portion of the air bubble-liquid mixture flow away from the aerator and to force it to diffuse downwardly and outwardly into the body of liquid, toward but not to its bottom and toward the periphery of the liquid body. The baffle means is preferably located at a point beyond the periphery of the "throw" of the aerator, where turbulent flow has begun to subside, but where the velocity of the flow is still above the rate of rise or terminal velocity in the liquid of the majority of air bubbles in the mixture. In this manner, such air bubbles are forced down into the liquid, mixing into fresh liquid at increasing pressure as downward flow continues, increasing the rate of oxygen absorption from the bubbles, due partly to the increased pressure, partly to exposure to less oxygenated liquid, and partly to longer bubble retention time.

It has been ascertained that the majority of air bubbles in the liquid-bubble mix flow induced by a mechanical surface aerator have a diameter less than about 10 millimeters and usually less than about 5 mm., at least after turbulent flow away from the aerator has continued appreciably so that its shearing action has been effective to break up large bubbles into smaller ones. Preferably, baffle means according to this invention are located at a distance from the aerator such that the bubble-liquid mix has had some flow but the velocity of flow is still greater than the terminal velocity of the rate of rise of air bubbles of 10 mm. or less in the liquid being aerated when in quiescent condition. For air bubbles of 10 mm. diameter or less, such terminal velocity is known to be slightly over 1 foot per second in distilled or tap water, fractionally less in most types of sewages wherein mechanical surface aeration has extensive usage.

The baffle means according to this invention presents a flow-redirecting surface opposed to the direction of flow of the bubble-liquid mix, extending from above the liquid level a substantial distance below the surface and generally outwardly inclined. Such a surface provides the desired downward and outward diffusion of the mix in the liquid body with low friction and turbulence which would cause undesirable velocity losses and also loss of air bubbles. The flow-directing surface may be planar but is preferably concave toward the aerator at least in its upper part, thereby producing a smoother directional change with even less undesirable losses than are caused by an inclined planar surface.

To realize substantial benefits therefrom, the flow redirecting surface should extend below the surface of the liquid body at least one foot (measured vertically) and may extend substantially further depending on conditions. Its interface with the liquid surface is located at a distance from the aerator which is preferably such that the velocity of flow of bubble-liquid mix is at least about 1 foot per second and should be such that the velocity is sufficient to carry the flow the full submerged length of the flow redirecting surface despite energy losses such as have been mentioned and also in overcoming hydrostatic head. The lower end of that surface is spaced above the bottom of the liquid body so that the mix flows outwardly into the liquid beyond it still retaining most of its bubbles. Thereafter, as the flow velocity drops below their terminal velocity, the bubbles rise, thus becoming desirably exposed to fresh, less aerated liquid which will absorb the air therefrom faster than more nearly air-saturated liquid. Since air absorption also increases with increase of time and of pressure, and since flow direction in accordance with the invention increases both of these factors, the aeration effectiveness of the aerator is substantially improved.

For maximum advantage, substantially the entire flow induced by the aerator should be intercepted by the baffle means, which should to that end surround circular flow pattern aerators such as the cone type or extend across the straight line flow of aerators such as the brush type. Less than complete diversion may, of course, be utilized to partial advantage or may be all that is feasible, for example where the walls confining the liquid are in part so close to the aerator that diversion of only that part of the flow toward walls relatively remote from the aerator is all that is practicable. To avoid a "dead" zone in the liquid immediately outside the baffle means it may be preferable to permit part of the flow to escape the baffle either through holes in it or through serrations in its upper edge.

The flow redirecting surface may be supported in a variety of ways. A preferred way is to utilize a float which is sufficiently buoyant to support the surface in the desired position and automatically maintain it there despite changes in liquid level of the body. For pontoon supported aerators, the flow re-directing surface may be a suitably formed inner wall of the supporting pontoons if they are suitably located with respect to the flow from the aerator, or otherwise supported from them. The baffle means may alternatively be supported from walls confining the liquid body.

In the accompanying drawing:

FIG. 1 is a view partly in elevation, partly in vertical section, of a mechanical surface aerator of the circular flow pattern type and baffle means according to the invention;

FIG. 2 is a largely diagrammatic top plan view of an aerator and baffle means as in FIG. 1 mounted in a rectangular aeration tank;

FIGS. 3 and 4 are views partly in elevation, partly in vertical section of pontoon mechanical surface aerators embodying the invention; and FIG. 5 is a diagrammatic view of the invention utilized in connection with a straight line flow type of mechanical surface aerator.

In FIGS. 1–4, a mechanical surface aerator of the cone type is shown as illustrative of the vertical axis, circular flow pattern aerator. However, the cone type is only one of many that are commercially available as previously mentioned and it should be understood that the invention may be similarly utilized with other types. The aerator of these figures, shown only in outline, may be constructed, for example, as shown in detail in Bolton U.S. Pat. 2,802,647, dated Aug. 13, 1957.

Referring to FIG. 1, the aerator is shown operating in a large body of liquid L, usually water with suspended solids such as sewage and industrial waste. The body may be contained in a tank or it may be a lagoon, lake or river. The aerator has a hollow rotor with blades 10 which is rotated about a vertical axis, in an inverted, open bottomed cone 12 largely submerged in the liquid, by drive connections indicated generally at 14 through a drive spider 16 connected to the rotor. The cone may or may not be equipped with a draft tube 18, shown in dotted lines. The liquid is drawn into the base of the cone, either directly or through the base of the draft tube if one is used, as indicated by the arrows, and is ejected outwardly by the blades as a cascade of spray and stream, indicated by the dash lines, in a spiral trajectory back onto the surface of the body L in a zone spaced outwardly of the cone. The frothy, bubbly mass flows outwardly in a generally circular flow pattern until it is intercepted by the outwardly inclined inner flow re-directing surface 20 of a baffle member designated generally 22. Surface 20 forces the flow to turn downwardly and then outwardly under the lower end of member 22 as previously described and as indicated by the dashed arrow.

Surface 20 is normally located some distance outwardly of the limit of throw of the aerator, although it may be located within that limit if it is desired to have some of the cascade thrown over the baffle member to eliminate a "dead" area just beyond it. As previously stated, surface 20 should be located at a point where the velocity of flow is sufficient to carry it downwardly and outwardly under member 22, preferably where the veolcity of flow is at least of the order of 1 foot per second for adequate bubble retention, and should have a submerged length corresponding to a vertical distance of at least about 1 foot.

The aerator is suspended from framework only partially indicated at 24 in FIG. 1 and which may be connected to supports located at the sides of the liquid body container, or extending up from its bottom through the liquid, or which may be carried by pontoons. The supporting structure for baffle member 22, which is not shown in FIG. 1, may take various forms such as described earlier herein, some of which are illustrated in the other figures.

FIG. 1 shows the baffle member 22 as circular in configuration and this is to advantage with aerators of the general type shown. However, for simplicity of manufacture or other reasons it may be preferable to form that member of sections joined together as a hexagon or other polygon. Also, FIG. 1 contemplates that member 22 surrounds the aerator. As previously stated, this is not necessary, and in some cases might not be desirable, as in that illustrated in FIG. 2.

FIG. 2 shows an aerator according to FIG. 1 installed to operate in a rectangular tank 30. In this instance, the sides of the tank are so close at their mid portion to the limit of throw of the aerator that little or no advantage would be gained by extending the baffle member between the aerator and such mid-wall portions of the tank. Consequently, in FIG. 2, two baffle members 32 are provided between the aerator and the more remote side and end walls of the tank. As shown, these members are mounted at their ends in supports 34, located on the sides of tank 30. Advantageously, members 32 are vertically adjustable in supports 34 to conform to changes in liquid level in tank 30, and also supports 34 are adjustably mounted, as on rails, for movement toward and away from the aerator. Such latter adjustment may be desirable in cases wherein the operation of the aerator is varied substantially in accordance with conditions and changing aeration requirements such that its throw and the velocity of its induced flow vary accordingly. The most desirable location of members 32 as above described will therefore vary accordingly, and members 32 can be maintained in most desirable location by adjusting their position longitudinally of the sides of the tank 30.

Similar adjustability of baffle members toward and away from the axis of the aerator can be provided in a surrounding baffle member such as shown in FIG. 1 by making such member in overlapping, separate and separately supported sections. However, in most cases, variation in operation of the aerator is not sufficient to make such adjustability of sufficient consequence to warrant its expense and the location of the baffle member or members is fixed relative to the axis at the most favorable position for its normal operation.

FIG. 3 shows an aerator of the type shown in FIGS. 1 and 2 which is suspended from framework 40 supported on a pontoon structure 42. In this instance, the pontoon structure surrounds the aerator at a greater distance from its axis than the approximate maximum throw of the aerator. The inner surface 44 of the pontoon toward the aerator provides the flow redirecting surface according to the invention, which, in this instance, has the preferred form, being concave toward the aerator in its upper part, then extending outwardly in a smooth curve, and is also located at the desired distance from the aerator in accordance with the principles previously discussed. The pontoon 42 may be of any suitable structure filled with air or other gas, preferably being filled with a resin foam such as polyurethane foam.

Particularly when the aerator is operating in a shallow liquid body, it may be desirable to provide a second flow directing surface under the surface 44 or 20 to insure outward flow of the bubble liquid mix into the liquid beyond that surface and prevent it short-circuiting into the flow to the aerator. Such a secondary baffle is indicated in dotted lines at 46 in FIG. 3, supported from float 42 by flanges 48 which are preferably, as indicated, in the form of thin plates arranged more or less radially to the axis of the aerator in order to inhibit undesired vortical flow pattern about the axis of the aerator which could interfere with the desired outward flow pattern.

FIG. 4 shows an aerator of the type shown in FIGS. 1–3 suspended from framework 50 which, as in FIG. 3, is supported by pontoon structure, designated 52, but in this case the pontoon structure 52 is of smaller diameter, located substantially inside the throw of the aerator. A flow redirecting surface 54 according to the invention is supported by a separate pontoon structure 56 surrounding the aerator and pontoon structure 52, which locates surface 54 at least approximately beyond the throw of the aerator, said surface having a planar downward and outward slope like that of surface 20 in FIG. 1. The aerator is secured in position and against rotation by suitable anchoring connections (not shown), as is the aerator of FIG. 3.

Pontoon structure 56 is held in fixed position relative to pontoon structure 52 by struts 58 which are preferably as shown thin, substantially radially arranged plates secured at opposite ends to the two pontoon structures and which in this form serve the additional function of inhibiting vortical flow. Radially arranged plates 60 secured to pontoon structure 52 and extending inwardly under the aerator serve to inhibit the formation of vortical flow under it.

Pontoon structure 56 may be circular in outline shape as shown or polygonal, the latter shape being somewhat more inhibitive of vortical motion in the flow inside it. Surface 54 need not be pontoon supported and could simply be the inner surface of an inclined plate secured to pontoon structure 52 by struts such as 64. However, in the FIG. 4 embodiment, pontoon structure 56 functions desirably as an outrigger to stabilize the main inner pontoon structure. The location of surface 54 with respect to the aerator and flow therefrom is determined as described in connection with surfaces 44 and 20 of figures previously discussed. A baffle spaced under it may be provided such as baffle member 46 in FIG. 3.

The flow redirecting surface need not be formed as the inner surface of the pontoon structure as in FIGS. 3 and 4 but may be provided as the inner face of a plate supported inside a pontoon structure of any desired cross-sectional shape. Further, pontoon support for that surface may be advantageously provided in cases where the aerator is mounted on fixed supporting structure.

FIG. 5 shows diagrammatically an aerator of the well-known brush type having a rotor 70 with beater bars 72 projecting from its surface in a longitudinal array similar to the bristles of a brush. The rotor is supported at opposite ends from walls, one being partially indicated at 74, which may be the sides of a tank or other fixed support structure or two spaced pontoons and one of which carries the drive equipment (not shown). Rotation of this aerator in the direction of the arrow churns the liquid into a bubbly cascade of spray and streams similar to that produced by the aerators previously described but in this case flowing unidirectionally, to the right in FIG. 5 as indicated by the dashed arrows.

A baffle member 76, having a flow redirecting surface 78 downwardly and outwardly inclined, extends across the flow from the aerator at a right angle thereto beyond the throw of the aerator and at a distance therefrom determined as previously described in connection with aerators which produce flows of a generally circular configuration. Member 76, which may be supported at its ends from wall 74 and the opposite wall as in FIG. 2, is provided intermediate its ends with a longitudinal row of apertures 80 through which some of the downwardly directed bubble-liquid mix escapes outwardly to aerate the otherwise "dead" area of liquid immediately beyond the member. A similar effect can be produced less advantageously by providing serrations along the top edge of member 76 to permit some of the surface flow to pass therethrough, and such apertures or serrations may be provided for this purpose in the baffle members or pontoon structures of the other embodiments.

I claim:
1. In combination with a mechanical surface aerator supported adjacent the air-liquid interface of a large body of liquid and operative therein to produce a mixture of air bubbles and liquid which flows away from the aerator at a velocity in excess of one foot per second, baffle means having a flow redirecting surface opposed to a major portion of said flow extending into the liquid body a distance at least of the order of one foot below its surface measured vertically but less than the depth of said body and being generally downwardly and outwardly inclined, and means supporting said baffle means at a spacing from the aerator which is beyond at least the major part of the throw of the aerator and is such that the flow velocity of said mixture in the vicinity of said surface is sufficient to force the mixture to flow downwardly and outwardly into the liquid body beyond said surface.

2. The combination of claim 1 in which said spacing is such that the velocity of flow of said mixture in the vicinity of said surface is at least of the order of one foot per second.

3. The combination of claim 1 in which said supporting means for said baffle means comprises a pontoon structure connected to said surface.

4. The combination of claim 3 which also includes frame structure secured to said pontoon and said aerator for supporting said aerator.

5. The combination of claim 1 in which said aerator produces outward flow about a vertical axis and said surface substantially surrounds said flow.

6. The combination of claim 5 wherein said aerator is supported from framework mounted on a pontoon structure disposed between the aerator and the inner limit of its throw and which includes struts fastened to said pontoon structure and said surface for maintaining said surface in axially fixed position.

7. The combination of claim 5 wherein said surface is annular and substantially concentric with the axis of the aerator.

8. The combination of claim 1 wherein said surface is concave toward the aerator in the upper part of its submerged portion.

9. The combination of claim 1 wherein said supporting means for said baffle means comprises a pontoon shaped to provide said surface on a side thereof facing the aerator.

10. The combination of claim 1 wherein said baffle means includes a baffle member supported in the liquid body spaced below said surface and outwardly directed.

11. The combination of claim 1 wherein said surface is provided with openings through which some of said mixture is permitted to pass outward to the liquid immediately beyond said surface.

12. The combination of claim 11 in which said openings are located below the surface of the liquid.

13. The combination of claim 1 wherein said surface comprises at least two separate sections mounted for adjustable movement toward and away from the aerator.

References Cited
UNITED STATES PATENTS 2,802,647   8/1957   Bolton _____ 259—8
3,235,877   2/1966   Grob _____ 259—108 X EDWARD L. ROBERTS, Primary Examiner U.S. Cl. X.R.
210—63; 259—8